Dec. 2, 1969  F. DEUSCHLE  3,481,367
THREE-WAY STOPCOCK
Filed June 13, 1967
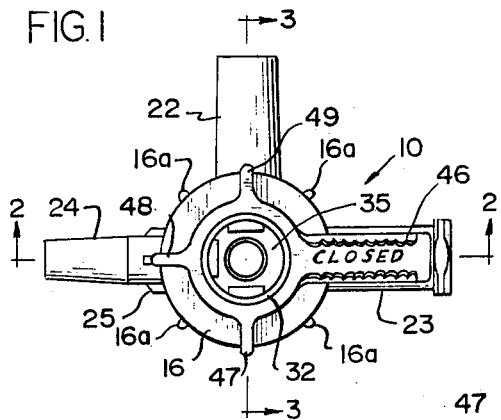
FIG.1
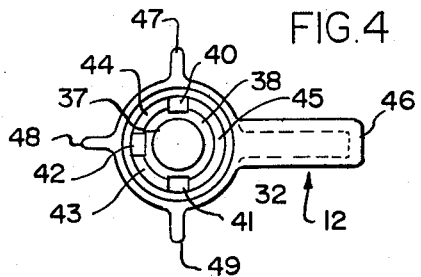
FIG.4
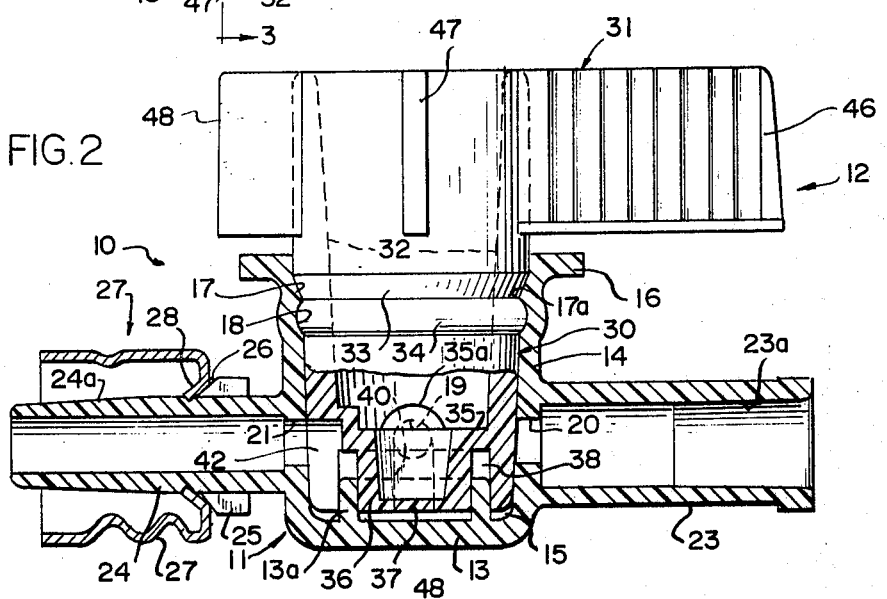
FIG.2
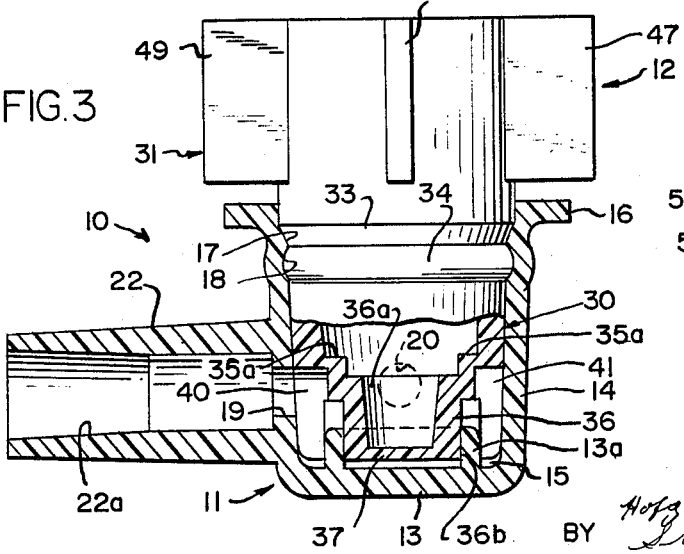
FIG.3
FIG.5
INVENTOR
FRITZ DEUSCHLE
BY Hofgren, Wegner, Allen,
Stellman & McCord.
ATTORNEYS.

United States Patent Office 3,481,367
Patented Dec. 2, 1969

3,481,367
THREE-WAY STOPCOCK
Fritz Deuschle, Saint Augustine, Fla., assignor to Brunswick Corporation, a corporation of Delaware
Filed June 13, 1967, Ser. No. 645,809
Int. Cl. F16k 5/00
U.S. Cl. 137—625.47          10 Claims

ABSTRACT OF THE DISCLOSURE

A valve including a body having a plurality of ports therein and a manually rotatable plug retained in the body and having a plurality of passageways movable into and out of communication with the body ports. A recess is provided in the bottom of the plug for establishing communication between the body ports through the plug passages, and a generally cylindrical core is provided centrally of the bottom portion of the plug, first to minimize the amount of dead space within the valve, and second to give the plug the ability to expand under pressure. An annular rib is provided on the inner surface of the base of the valve body, and presses the wall structure of the valve plug into sealing engagement with the wall of the valve body.

Background of the invention

The valve of the present invention has particular utility in the surgical arts, although it will be readily apparent from the following detailed description that the valve is not limited to this use, and may in fact be used in environments where relatively high pressures are found. Heretofore, those skilled in the surgical arts have recognized the long felt need for a valve of the three-way stopcock type that was sufficiently simple in design and inexpensive to manufacture that the valve could be disposed of after a single use. One of the salient advantages of such a disposable valve would be the effective elimination of the problem of cross contamination, which is inherently present in reusable devices. Many attempts have been made in the past to satisfy this need; however, valves of the three-way stopcock type that have been proposed are either not inexpensive enough to be disposable after one use or those that have been sufficiently inexpensive have been unacceptable from a mechanical functioning viewpoint.

Summary of the invention

The valve of the present invention is of extremely simple design so that it can be easily fabricated from inexpensive materials by relatively inexpensive methods. Because of this, the valve of the present invention can be manufactured in large quantities at relatively low cost, with the resulting economy making the valve truly disposable after a single use. It will be appreciated that when it is not necessary to maintain aseptic conditions, the valve may be used a plurality of times, or in fact continuously.

Several features of the valve of the present invention contribute to its outstanding utility in the surgical art, and one of the more important features of the valve is the extremely small amount of dead space within the valve interior as well as being designed in such a manner that air cannot become entrapped. This feature is extremely important, as for example when the valve is used in connection with apparatus for measuring spinal fluid pressure, in that in such a use it is crucial that only a relatively small quantity of cerebrospinal fluid be withdrawn from the patient. In fact, the valve of the present invention has particular utility with the manometric device disclosed in copending application Ser. No. 645,810, filed June 13, 1967, in the names of Robert E. Reiss and Jack D. Merry, and assigned to the assignee of the present application.

Another extremely important feature of the valve of the present invention is the wall structure of the valve plug which creates a positive fluid tight seal with the wall structure of the valve body, so as to insure that no leakage will take place from the valve. The wall structure is defined by a plurality of spaced wall segments disposed outwardly of an annular recess in the bottom of the valve plug, and the pressure of the fluid within the recess presses the wall segments outwardly into fluid tight sealing engagement with the surrounding valve body wall.

A further feature of the present invention is the provision of indicating means, on both the valve plug and the valve body, which can not only be readily seen, but which can also be readily felt, to thereby quickly appraise the surgeon or other individual using the valve as to the valve ports which are open and those which are closed.

Other features and advantages of the invention will become readily apparent to those skilled in the art from the following detailed description taken in connection with the annexed drawing wherein:

Brief description of the drawing

FIG. 1 is a plan view of a preferred valve embodiment;

FIG. 2 is an enlarged view, partly in section, and taken along line 2—2 of FIG. 1;

FIG. 3 is an enlarged view, partly in section, and taken along line 3—3 of FIG. 1;

FIG. 4 is a bottom plan view of the valve plug on the scale of FIG. 1; and

FIG. 5 is a bottom plan view of the valve on a reduced scale, with protective caps in place that are used during shipment and storage.

Description of the preferred embodiment

Referring now to the drawing in greater detail, the valve 10 of the present invention is of the three-way stopcock type, and includes a body 11 and a plug 12. Body 11 includes a generally circular base 13, and a generally cylindrical wall 14 extends upwardly from base 13 at the periphery thereof. The inner and outer surfaces of wall 14 are inclined slightly outwardly, and a somewhat frusto-conically shaped valve chamber 15 is defined within wall 14 above base 13. A flange 16 extends outwardly from wall 14 at the upper end thereof, and flange 16 is disposed in a plane that is parallel to the plane of base 13. As will hereinafter be explained in detail, an inclined seating surface 17 is provided on the inner face of wall 14 spaced downwardly from the upper end thereof a slight amount, and a rounded retention groove 18 is also provided in wall 14 immediately below seating surface 17. A plurality of circular ports 19–21 are provided in an intermediate portion of wall 14 at positions spaced 90° apart from one another, with ports 20 and 21 being in axial alignment, and port 19 being disposed at right angles with respect to ports 20 and 21. Duct members 22–24 extend generally radially outwardly of wall 14 in alignment with ports 19–21 respectively, and the ducts may be connected to external means, such as the manometer and hypodermic needle described in detail in the above mentioned Reiss et al application. For this purpose, the outer ends of the bores of ducts 22 and 23 are provided with female Luer tapers 22a and 23a, while the outer surface of duct 24 is provided with a male Luer taper 24a at the outer end thereof. A plurality, four in the illustrated embodiment, of projections 25 are provided on duct 24 at equally circumferentially spaced positions therearound, and a Luer lock ferrule 27 is positioned on duct 24 with the teeth 28 thereon bearing against inclined surfaces 26 on projections 25 and biting into the duct material adjacent the projections 25 to positively retain the ferrule on the duct.

Indicating means is provided on flange 16 and cooperates with means to be hereafter described on the plug 12 to provide a visual and manually feelable indication of when the valve ports 19–21 are closed, and in the illustrated embodiment, the indicating means takes the form of a plurality of projections 16a that extend radially outwardly from the side face of flange 16. Four projections 16a are provided, and the projections are equally circumferentially spaced around flange 16, with a first projection 16a being spaced an equal angular distance between ducts 22 and 23, and a second projection 16a being spaced an equal angular distance between ducts 22 and 24.

Plug 12 includes a lower mounting portion 30 received in valve chamber 15, and a manually grippable portion 31 at the upper end thereof positioned above the valve body 11. Plug 12 is partially defined by a generally cylindrical wall 32, that is inclined slightly outwardly, as can be best seen in FIG. 2. An intermediate portion of the outer surface of wall 32 is inclined inwardly, as shown at 33; and an enlarged rounded bead 34 is provided immediately therebelow. Body 11 is preferably formed of a low cost plastic material having an inherent degree of resiliency, such as an acetyl copolymer; and plug 12 is also formed of a low cost plastic material, such as a high density polyethylene. Each of these materials lend themselves to a molding process, so that it will be appreciated that both the valve plug 12 and the valve body 11 can be readily and inexpensively fabricated. It will further be appreciated that the plug 12 may be assembled to the body 11 by merely placing the lower portion of wall 32 of the plug mounting portion 30 in the valve chamber 15 of body 11, and then pressing the valve plug and valve body toward one another to force the enlarged bead 34 on the plug 12 over the ridge 17a formed between body wall portions 17 and 18. The valve plug 12 will snap into place, with the bead 34 seated in groove 18, and with the inclined surface 33 bearing against seating surface 17. The engagement of bead 34 with recess 18 will positively retain the plug 12 in assembled relationship with the body 11, and the seating of plug surface 33 against body surface 17 will positively locate the passages in the valve plug, to be hereafter described, relative to the body ports 19–21.

A generally horizontally disposed wall 35 (FIG. 2) extends inwardly from the wall 32 of plug 12 adjacent the lower end thereof, and a generally cylindrical wall 36 extends downwardly from the inner end of wall 35. A generally horizontally disposed wall 37 extends across the bottom of wall 36 and cooperates therewith to define a closed, generally cylindrically cup-shaped member that occupies a large amount of the dead space in valve chamber 15 at the bottom thereof. The inner surface 36a of wall 36 is inclined outwardly slightly, while the outer surface 36b of wall 36 is generally cylindrically shaped, and is positioned in sliding, face abutting engagement with the inner surface of an upstanding rib 13a on base 13 to provide a positive seal therebetween. The lower portion of plug wall 32 is spaced radially outwardly of wall 36 to thereby define an annular recess 38 in the bottom of the plug between wall 32 and wall 36. Rib 13a is received in recess 38, and is preferably thicker than the width of recess 38 to maintain a fluid tight seal between the rib 13a and the plug walls 36 and 32. Additionally, the lower portion of plug wall 32 is preferably thicker than the distance between the outer surface of rib 13a and the inner surface of body wall 14, so as to maintain a fluid tight seal between the bottom of wall 32 and the body wall 14. It will be appreciated that although the wall 36, rib 13a, lower portion of wall 32, and body wall 14 are pressed into sealing engagement with one another, because of the inherent slippery characteristics of the plastic materials from which the body 11 and plug 12 are formed, the plug 12 can be easily rotated relative to the body 11. It will be appreciated that rib 13a occupies a major portion of the recess 38 in the bottom of the valve plug, so that only an extremely small volume chamber is provided in the valve plug for establishing communication between the plug passages to be hereafter described.

Three passages 40–42 are provided in plug wall 32, and semi-circular hubs 35a are provided on wall 35 in alignment with passages 40–42. The width of passages 40–42 is substantially the same as the diameter of ports 19–21, and the upper ends of passages 40–42 are rounded so as to be alignable with ports 19–21 when the plug 12 is properly seated within the body 11. The radial length of passages 40–42 is slightly longer than the thickness of wall 32, so that the upper ends of the passages extend into the hubs 35a. Passages 40–42 are spaced at 90° increments around wall 32, with passages 40 and 41 being positioned in diametric alignment, and passage 42 being positioned equally therebetween at right angles with respect thereto. Passages 40–42 are open to the bottom of wall 32, and thus define a plurality of circumferentially spaced wall segments 43–45 therebetween. As seen in FIG. 4, wall segments 43 and 44 are slightly less than 90° in angular extent, while wall segment 45 is slightly less than 180° in angular extent. This wall structure is of significant importance in contributing to the improved operation of the valve 10, in that when fluid under pressure is present within annular passage 38, the wall segments 43–45 are urged outwardly into sealing engagement with the facing surface of body wall 14.

The gripping portion 31 of plug 12 is provided with an outwardly projecting handle 46 that is preferably provided with serrations in the outer sides thereof to facilitate manual manipulation of the plug 12. As is evident from FIG. 4, handle 46 extends outwardly from wall 32 at the same side of the plug as wall segment 45, and since wall segment 45 is adapted to selectively block one of the body ports 19–21, the upper surface of the handle 46 is preferably provided with indicia, such as upraised letters spelling the word "closed," for indicating which of the ports is closed. Plug portion 31 is provided with further indicating means in the form of a plurality of axially elongate ribs 47–49 that extend generally radially outwardly of wall 32 at equally circumferentially spaced positions therearound, and in alignment with passages 40–42.

With the valve plug in the position illustrated in FIGS. 1–3, the plug handle 46 indicates that the port 20 is closed, and communication is established between the ports 19 and 21 through plug passage 40, annular passage 38, and plug passage 42. When it is desired to close all of the ports, the plug 12 is rotated to a position wherein the ribs 47–49 are each aligned with a projection 16a, and this positions the plug passages 40–42 intermediate the body ports 19–21, with the wall segments 43–45 blocking the body ports. The closed position of the valve is readily visible when the ribs 47–49 are aligned with the projections 16a, and this closed position can also be manually felt, if for example, a surgeon's attention is directed elsewhere.

Means is provided for maintaining the valve 10 in an aseptic condition during shipment and storage, and such means takes the form of a cap assembly 50 illustrated in FIG. 5. The cap assembly includes a plurality of cap members 51, 52, 53, each having overhanging flange portions 51a, 52a and 53a, respectively, interconnected by straps 54 and 55. The flanges 51a, 52a and 53a on the caps 51, 52 and 53 are used as purchase surfaces for the thumb or finger of a user to assist in popping the cap from the open end of the ducts 22, 23 and 45. The straps 54 and 55 are provided with weakened portions 54a and 55a at opposite ends thereof that are connected respectively to the flanges 51a and 52a of caps 51 and 52, and the flanges 52a and 53a of caps 52 and 53. In this manner, one or more of the caps may be removed, when desired, and the other caps may be retained in place, to retain the duct member associated therewith in an aseptic condition. Cap 51 includes an internal bore, not shown, having an internal Luer taper that is received over the external Luer taper 24a on duct 24. Caps 52 and 53 have central plugs, not shown, having an external Luer taper that fits within the internal Luer tapers 22a and 23a of ducts 22 and 23, respectively.

I claim:

1. A valve comprising: a body including a base, an upstanding wall around the periphery of the base defining a chamber therewithin, a plurality of ports in said wall communicating with said chamber; a plug mounted for rotation relative to said body, said plug having a lower mounting portion received in said chamber with an annular recess being provided in the bottom of said mounting portion, said annular recess being defined by a generally cylindrical cup-shaped member inwardly of the recess and wall structure outwardly of the recess, said wall structure being positioned in sliding face abutting engagement with the wall of the body, said cup-shaped member being positioned in sliding sealing engagement with the base of the body so as to form a sealed annular channel in said recess between said cup-shaped member and said wall structure, a plurality of passageways in said wall structure communicating with said channel, said passageways being movable into and out of communication with said ports upon rotation of said plug, said plug having a manually grippable portion at the upper end thereof; and cooperating means on said body and said plug for retaining said plug in operative association with said body.

2. A valve as defined in claim 1 wherein said passageways open to the bottom of said wall structure whereby a plurality of separate wall segments are provided around the bottom of said wall structure.

3. A valve as defined in claim 1 wherein said upstanding wall includes an annular recess in the inner surface thereof, an said plug mounting portion includes a circular rib around the external periphery thereof received in said annular recess.

4. A valve as defined in claim 3 wherein said upstanding wall includes an inclined seating surface immediately above said annular recess, and wherein said plug includes a complementarily shaped seating surface that bears against the seating surface of said wall.

5. A valve as defined in claim 1 wherein said plug is defined in part by an upright generally cylindrical wall having its lower end rotatably received in said valve chamber.

6. A valve as defined in claim 5 wherein an upstanding annular rib is provided on the base of said body, said rib being received in the annular recess of the plug so as to be in sliding sealing engagement with the cup-shaped member, with the lower portion of said plug wall being received between the outer surface of said rib and the inner surface of said body wall.

7. A valve as defined in claim 1 wherein cooperating indicating means are provided on said body and said plug for indicating that all body parts are closed when said indicating means are aligned.

8. A valve as defined in claim 7 wherein said grippable portion includes an elongate handle having indicia thereon for indicating which of the valve ports is closed.

9. A valve as defined in claim 1 including means removably associated with each of said ports for maintaining the same in an aseptic condition.

10. A valve as defined in claim 9 wherein said means includes a cap member associated with each port, with the cap members being interconnected by breakable strap members.

References Cited
UNITED STATES PATENTS

| | | | |
|---|---|---|---|
| 251,832 | 1/1882 | Clark | 137—381 X |
| 765,229 | 7/1904 | Dunlop | 251—310 |
| 2,699,776 | 1/1955 | Alexander | 251—310 X |
| 3,185,179 | 5/1965 | Harautuneian | 137—625.47 |
| 3,186,437 | 6/1965 | Buono | 128—274 X |
| 3,276,472 | 10/1966 | Jinkens et al. | 137—625.41 X |
| 3,305,211 | 2/1967 | Phillips | 137—625.47 X |

M. CARY NELSON, Primary Examiner

MICHAEL O. STURM, Assistant Examiner

U.S. Cl. X.R.

251—309, 368